(12) United States Patent
Kwak et al.

(10) Patent No.: US 8,464,419 B2
(45) Date of Patent: Jun. 18, 2013

(54) METHODS OF AND FACTORIES FOR THIN-FILM BATTERY MANUFACTURING

(75) Inventors: Byung-Sung Kwak, Portland, OR (US); Stefan Bangert, Steinau (DE); Dieter Haas, San Jose, CA (US); Omkaram Nalamasu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 226 days.

(21) Appl. No.: 12/882,002

(22) Filed: Sep. 14, 2010

(65) Prior Publication Data

US 2011/0126402 A1 Jun. 2, 2011

Related U.S. Application Data

(60) Provisional application No. 61/244,800, filed on Sep. 22, 2009.

(51) Int. Cl.
*B23P 19/00* (2006.01)
*C23C 16/00* (2006.01)

(52) U.S. Cl.
USPC ............................................ 29/650; 118/715

(58) Field of Classification Search
USPC ............................................ 29/650; 118/715
See application file for complete search history.

(56) References Cited

U.S. PATENT DOCUMENTS

| | | | | |
|---|---|---|---|---|
| 6,402,796 | B1 * | 6/2002 | Johnson | ................. 29/623.5 |
| 2009/0061319 | A1 | 3/2009 | Kim et al. | |
| 2009/0148764 | A1 * | 6/2009 | Kwak et al. | ............ 429/162 |

FOREIGN PATENT DOCUMENTS

| | | |
|---|---|---|
| JP | 2009009897 | 1/2009 |
| JP | 2009064667 | 3/2009 |

OTHER PUBLICATIONS

International Search Report and Written Opinion from PCT/US2010/049536 mailed Jun. 3, 2011, 8 pgs.
International Preliminary Report on Patentability from PCT/US2010/049536 mailed Apr. 5, 2012, 5 pgs.

* cited by examiner

*Primary Examiner* — Karie O'Neill Apicella
(74) *Attorney, Agent, or Firm* — Blakely Sokoloff Taylor Zafman LLP

(57) ABSTRACT

Methods of and factories for thin-film battery manufacturing are described. A method includes operations for fabricating a thin-film battery. A factory includes one or more tool sets for fabricating a thin-film battery.

19 Claims, 15 Drawing Sheets

METHODS OF AND FACTORIES FOR THIN-FILM BATTERY MANUFACTURING

CROSS REFERENCE TO RELATED APPLICATIONS

This application claims the benefit of U.S. Provisional Application No. 61/244,800, filed Sep. 22, 2009, the entire contents of which are hereby incorporated by reference herein.

BACKGROUND

1) Field

Embodiments of the present invention pertain to the field of thin-film batteries and, in particular, to methods of and factories for thin-film battery manufacturing.

2) Description of Related Art

Current state of the art thin-film battery manufacturing plans are typically based on scaling of conventional technologies by (1) using shadow masks for patterning technologies and (2) the implementation of single step patterning based integration schemes. Complexity issues with such an approach can be significant. For example, deposition chambers or tools are typically fitted with glove boxes with specific atmospheric conditions designed to manage and protect material layers in thin-film batteries, material layers that are sensitive to normal ambient, and to protect deposition laden masks. The use of glove boxes can be cumbersome operationally and can add significant cost to the process, both in terms of capital and operating expenses, as well as potential impact to yield. In addition, the shadow mask based patterning can add other deleterious issues, for examples, alignment accuracies and potential defect induced yield impacts, as well as the cost of ownership increases due to extra components and frequent mask regeneration process for accuracy in pattern transfer and defect reduction.

To date, no complete factory for thin-film battery manufacturing has been assembled, although certain components based on conventional technologies have been disclosed. FIG. 1 illustrates an example of a conventional equipment arrangement for manufacturing thin-film batteries. Referring to FIG. 1, a deposition tool 100 suitable for thin-film battery manufacture is equipped with a glove box 102. For example, glove box 102 is typically included with a deposition tool 100 associated with a sputtering process. Although not depicted, additional glove boxes are often required for use with a lithium chamber or other chambers or processing tools used subsequent to, e.g., air-sensitive layer deposition processes.

DETAILED DESCRIPTION

Figure 1:
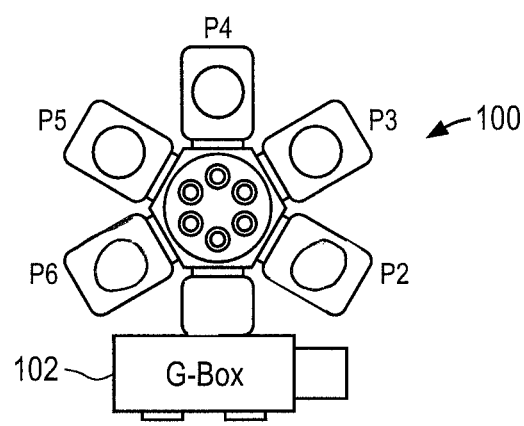
FIG. 1 illustrates an example of a conventional equipment arrangement for manufacturing thin-film batteries.

Methods of and factories for thin-film battery manufacturing are described. In the following description, numerous specific details are set forth, such as fabrication conditions and material regimes, in order to provide a thorough understanding of the present invention. It will be apparent to one skilled in the art that the present invention may be practiced without these specific details. In other instances, well-known aspects, such as thin-film battery applications, are not described in detail in order to not unnecessarily obscure the present invention. Furthermore, it is to be understood that the various embodiments shown in the Figures are illustrative representations and are not necessarily drawn to scale. Additionally, other arrangements and configurations may not be explicitly disclosed in embodiments herein, but are still considered to be within the spirit and scope of the invention.

Disclosed herein are methods for thin-film battery manufacturing. In an embodiment, a method includes operations for fabricating a thin-film battery.

Also disclosed herein are factories for thin-film battery manufacturing. In an embodiment, a factory includes one or more tool sets for fabricating a thin-film battery.

In accordance with embodiments of the present invention, methods and factories disclosed herein address one or more of the following issues or features: (a) integrated deposition systems and factories, (b) air ambient compatible manufacturing technologies, (c) complexity and cost reduction (d) silicon integrated circuit platforms, and (e) in-line deposition platforms. In some embodiments, complete factory models for thin film battery manufacturing technologies are presented herein. The uniqueness of the various systems may include (a) integrated platforms to minimize complexity and improve manufacturing integration, (b) shadow mask-less integration-compatible tools, and (c) complete tool sets for all processes, e.g., thin-film battery factory models.

With respect to the methods and factories disclosed herein, components for full factory models may include (a) physical vapor deposition chambers for metals, cathode, electrolyte and anode materials, (b) protective coating systems, consisting typically of polymer, dielectric, and metal deposition chambers or tools, (c) alignment systems for masked integration schemes, (d) periphery tools (e.g., laser or litho patterning) for mask-less integration. In accordance with some embodiments of the present invention, characteristics for thin-film battery manufacturing factories include (a) the use of smart "clustering" or integration to eliminate the need for inert ambient requirements (independent of masked or mask-less integration), (b) the use of unique chambers to eliminate a typically stand-alone lithium deposition chamber, eliminating or mitigating risks of air-exposure during transfer, and (c) the use of an optional vacuum transfer module (VTM). In accordance with an embodiment of the present invention, factory types include arrangements such as, but not limited to, 200 millimeter platforms, 300 millimeter platforms, in-line platforms, or combination platforms. In accordance with an embodiment of the present invention, process integration schemes include integration schemes such as, but not limited to, masked integration schemes or mask-less integration schemes.

Figure 2:
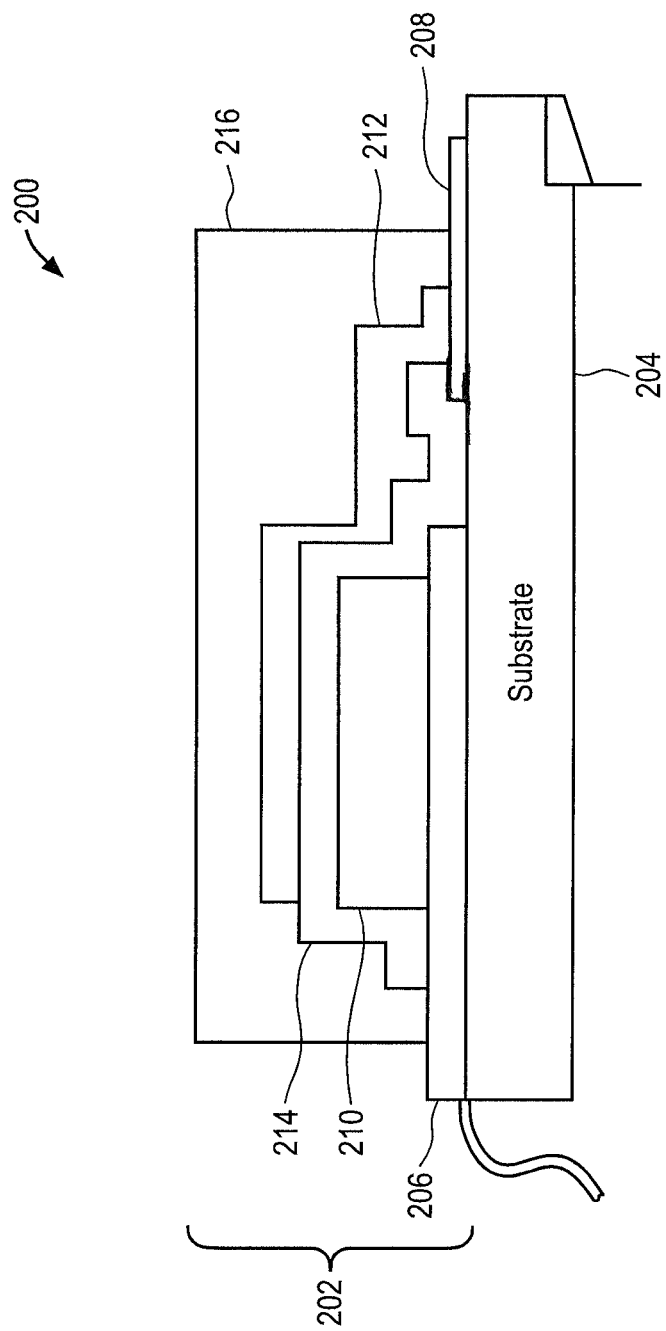
FIG. 2 illustrates a cross-sectional view of a representative thin-film battery contemplated for fabrication by the manufacturing processes and tooling arrangements described herein, in accordance with an embodiment of the present invention.

A variety of thin-film battery architectures may be contemplated for fabrication with the processes and tooling arrangements described herein. FIG. 2 illustrates a cross-sectional view of a representative thin-film battery contemplated for fabrication by the manufacturing processes and tooling arrangements described herein, in accordance with an embodiment of the present invention. Referring to FIG. 2, a thin film battery 200 includes a stack of layers 202 fabricated on a substrate 204. The stack of layers 202 includes a cathode current collector layer 206, an anode current collector layer 208, a cathode layer 210, an anode layer 212, an electrolyte layer 214, and a protective coating layer 216. In an embodiment, the stack of layers 202 has a thickness of approximately 15 microns. The actual total thickness may depend on the desired capacity of the battery for a given device area, which impacts the thickness of the cathode, anode and electrolyte. In an embodiment, anode layer 212 of thin-film battery 200 is a lithium anode layer. It is to be understood, however, that FIG. 2 illustrates only one possible arrangement for a thin-film battery structure, and that the concepts disclosed herein can be applied to any thin-film battery structure fabricated, e.g., by conventional process flow and integration schemes, including integration schemes described in U.S. patent application publication 2009/0148764.

In accordance with an embodiment of the present invention, thin-film battery manufacturing processes can be divided into two categories: (1) deposition of material layers and (2) patterning of the material layers. In terms of functionality, in an embodiment, the deposition processes can be divided into fabrication of active device and fabrication of protective coatings, both of which require some form of patterning. Thus, in one embodiment, factory models described herein consist of three sectors: (1) deposition of device materials, (2) deposition of protective coatings, and (3) patterning technologies.

In an embodiment, typical layers involved in active device fabrication are layers such as, but not limited to, current collectors, cathode (positive electrode), electrolyte and anode (negative electrode) materials. Typically, for the protective coatings, multiple layer stacks are used. In an embodiment, useful materials include materials such as, but not limited to, polymers, dielectrics, metals, or semiconductors. For patterning, the conventional method has included the use of shadow masks. In an embodiment of the present invention, a mask-less integration scheme is used, including both or either laser- and lithography-based methodologies.

In accordance with an embodiment of the present invention, examples of factory models include either or both Si—IC (200 or 300 millimeter substrate) and in-line platforms for both shadow mask based and mask-less based integration. In an embodiment, features of the shadow mask-less based, optimized silicon integrated circuit platform use ex situ lithography or laser based alignment and patterning technologies (e.g., elimination of complexity and misalignment potentials of in situ patterning using shadow masks) and the use of integrated lithium chamber(s) and unique integration methods to eliminate or at least minimize inert ambient requirements for air-sensitive material layers (e.g., cathode and anode layers).

Figure 3:
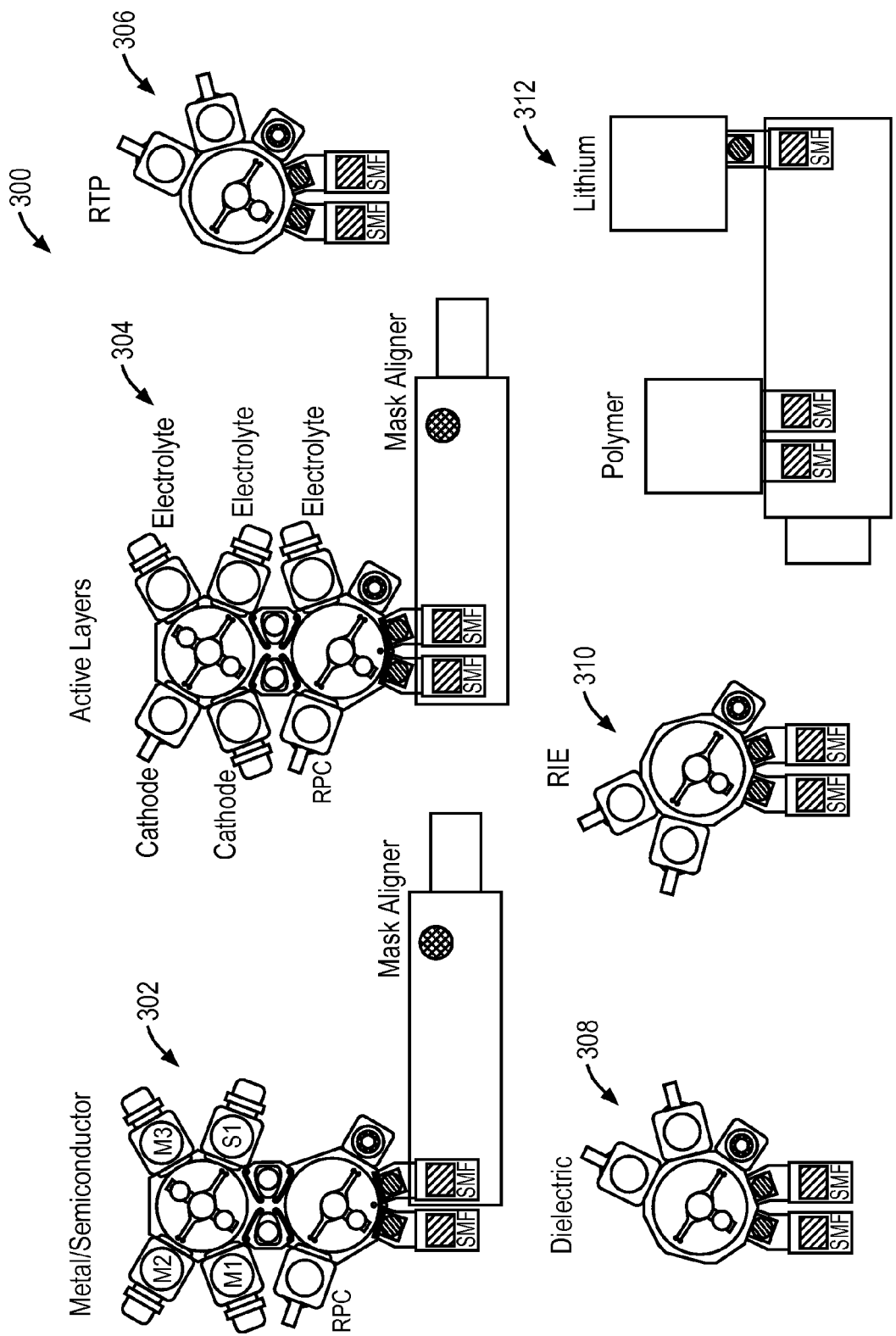
FIG. 3 illustrates a block diagram of a 200 millimeter thin-film battery manufacturing factory using a masked process, in accordance with an embodiment of the present invention.

In an aspect of the present invention, a factory model for masked integration is provided. FIG. 3 illustrates a block diagram of a 200 millimeter thin-film battery manufacturing factory using a masked process, in accordance with an embodiment of the present invention.

Referring to FIG. 3, a factory 300 for fabrication of a thin-film battery includes a first process tool 302 for depositing metal or semiconductor layers, a second process tool 304 for depositing active layers, a third process tool 306 for rapid thermal processing, a fourth process tool 308 for depositing dielectric layers, a fifth process tool 310 for performing reactive ion etching, and a sixth process tool 312 for depositing specialty layers for thin-film batteries. In accordance with an embodiment of the present invention, sixth process tool 312 is configured for deposition of both a lithium layer (e.g., a lithium anode layer) and a protective coating (e.g., a polymer layer) in the same process tool, as depicted in FIG. 3. The placement or absence of the glove boxes on various tools in this figure may be based on the assumption that the resulting layers or process from a given tool leads to either air stable or air sensitive "top" surfaces. Thus, the placement can change if the integration schemes (device patterning) change the nature of the layer or top surface after processing on a given tool. It is to be understood that, in an embodiment, one or more of the tool chambers or the SMF modules may be substituted with a vacuum transfer module (VTM) for one or more of the tools shown in FIG. 3.

Figure 4:
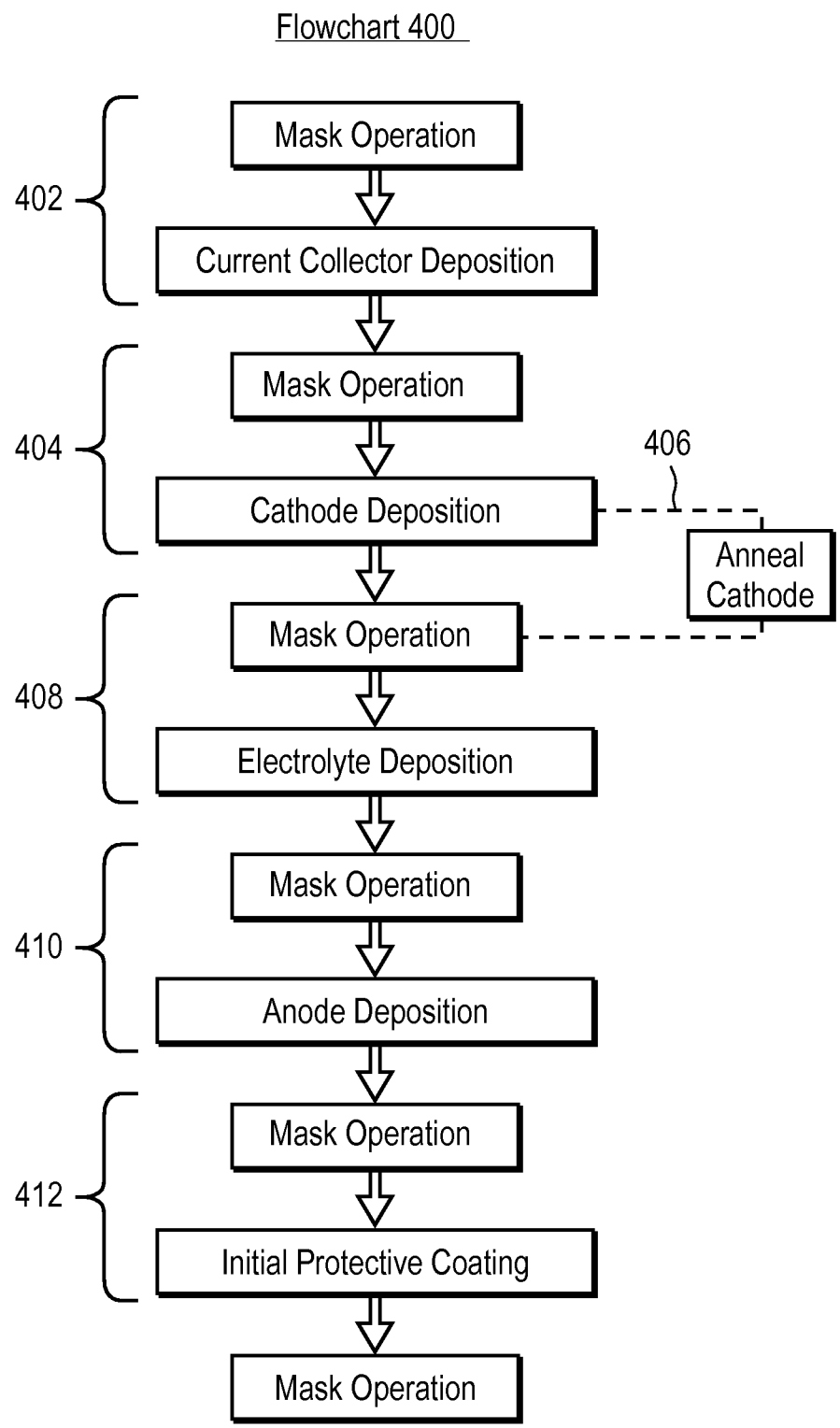
FIG. 4 illustrates a Flowchart representing operations in an integration scheme for fabricating a thin-film battery, in accordance with conventional methods.

In an aspect of the present invention, impacts of using an on-board lithium chamber and improved integration schemes for both anode and cathode materials are addressed. FIG. 4 illustrates a Flowchart 400 representing operations in an integration scheme for fabricating a thin-film battery, in accordance with conventional methods for cells having lithiated cathode and lithium anode. Referring to operation 402 of Flowchart 400, a thin-film battery manufacturing process includes a patterned deposition of a current collector layer. Referring to operation 404 of Flowchart 400, a thin-film battery manufacturing process includes a patterned deposition of a cathode layer. Referring to operation 406 of Flowchart 400, a thin-film battery manufacturing process includes annealing of the cathode layer (optional). Referring to operation 408 of Flowchart 400, a thin-film battery manufacturing process includes a patterned deposition of an electrolyte layer. Referring to operation 410 of Flowchart 400, a thin-film battery manufacturing process includes a patterned deposition of an anode layer. And, referring to operation 412 of Flowchart 400, a thin-film battery manufacturing process includes deposition of a protective coating layer. Depending on the requirements of the actual thin-film battery stack, post-deposition patterning can also be performed subsequent to the above operations.

Figure 5:
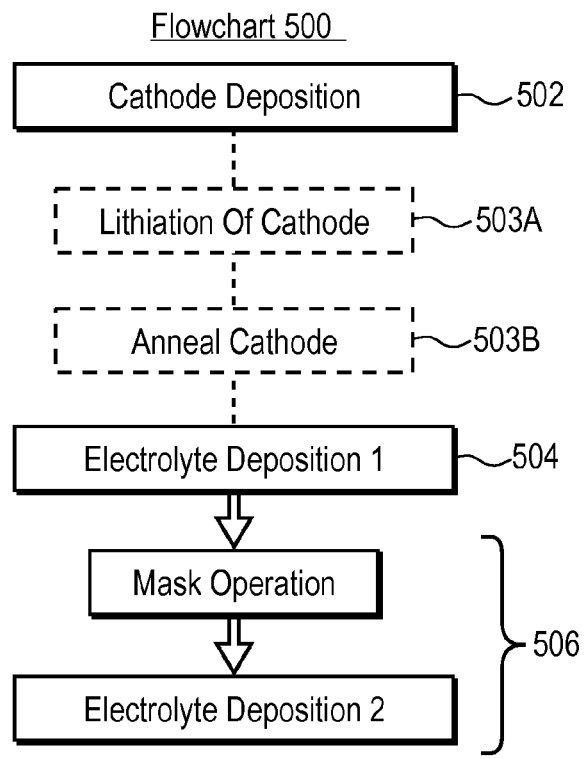
FIG. 5 illustrates a Flowchart representing operations in an integration scheme for fabricating a thin-film battery, in accordance with an embodiment of the present invention.

In a particular embodiment, a subsequent deposition of an electrolyte layer is performed on a cathode layer without exposing the cathode layer to air ambient in between the deposition processes. FIG. 5 illustrates a Flowchart 500 representing operations in an integration scheme for fabricating a thin-film battery, in accordance with an embodiment of the present invention. Referring to operation 502 of Flowchart 500, a thin-film battery manufacturing process includes deposition of a cathode layer. Referring to optional operation 503a, in one embodiment, the cathode layer is lithiated after deposition of a foundational cathode material which may or may not already include lithium. Referring to optional operation 503b, in one embodiment, the cathode layer is annealed, e.g., by heating the cathode layer. In a specific embodiment, the cathode layer is lithiated after deposition of a foundational cathode material which may or may not already include lithium and, subsequently, the cathode layer is annealed, e.g., by heating the cathode layer. The steps 503a and 503b can, in an embodiment, also be reversed. Referring to operation 504 of Flowchart 500, an electrolyte layer is then formed on the cathode layer, without exposing the cathode layer to ambient air conditions. Referring to operation 506 of Flowchart 500, a second electrolyte layer deposition operation, including a mask operation, is performed. In the event that the substrate on which the above layers are deposited is exposed to air ambient, the electrolyte layer protects the cathode layer.

Figure 6:
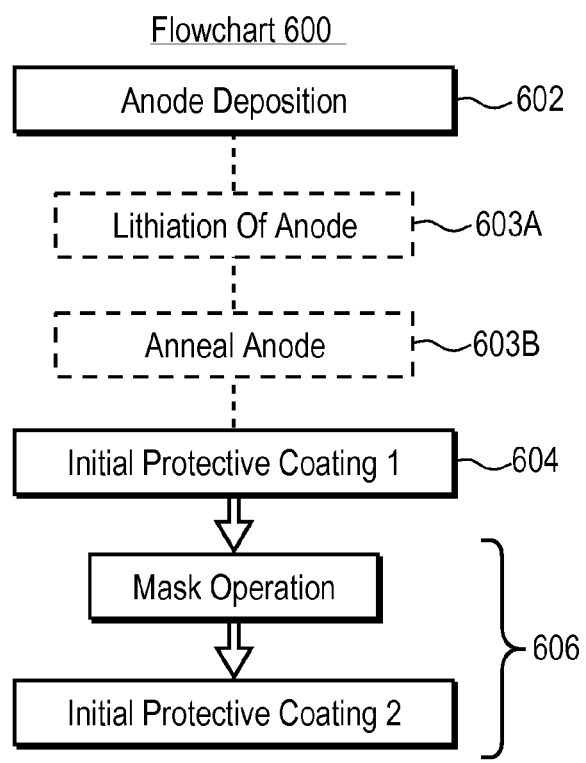
FIG. 6 illustrates a Flowchart representing operations in an integration scheme for fabricating a thin-film battery, in accordance with an embodiment of the present invention.

In another particular embodiment, a subsequent deposition of a metal layer, a dielectric layer, a dielectric-organic composite layer, or an organic layer is performed on an anode layer without exposing the anode layer to air ambient in between the deposition processes. FIG. 6 illustrates a Flowchart 600 representing operations in an integration scheme for fabricating a thin-film battery, in accordance with an embodiment of the present invention. Referring to operation 602 of Flowchart 600, a thin-film battery manufacturing process includes deposition of an anode layer. Referring to optional operation 603a, in one embodiment, the anode layer is lithiated after deposition of a foundational anode material which may or may not already include lithium. Referring to optional operation 603b, in one embodiment, the anode layer is annealed, e.g., by heating the anode layer. In a specific embodiment, the anode layer is lithiated after deposition of a foundational anode material which may or may not already include lithium and, subsequently, the anode layer is annealed, e.g., by heating the anode layer. Referring to operation 604 of Flowchart 600, an initial protective coating layer is then formed on the anode layer, without exposing the anode layer to ambient air conditions. Referring to operation 606 of Flowchart 600, a second coating layer deposition operation, including a mask operation, is performed. In the event that the substrate on which the above layers are deposited is exposed to air ambient, the initial protective coating layer protects the anode layer.

Figure 7:
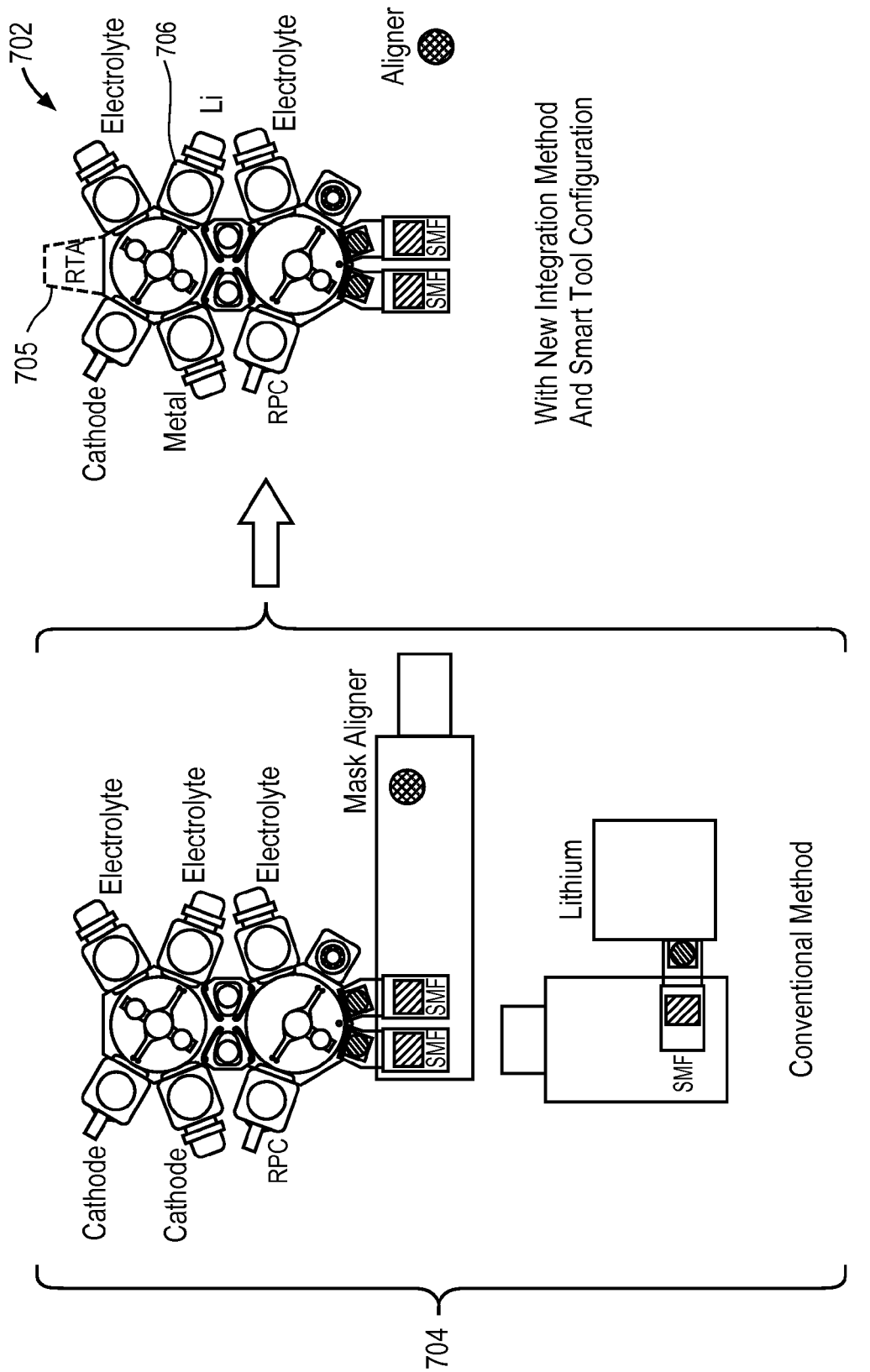
FIG. 7 illustrates an arrangement of a 200 millimeter cluster tool suitable for thin-film battery methods including incorporation of a lithium anode and lithiation of a cathode, versus a conventional arrangement of processing equipment, in accordance with an embodiment of the present invention.

FIG. 7 illustrates an arrangement of a 200 millimeter cluster tool suitable for thin-film battery methods including incorporation of a lithium anode and lithiation of a cathode, versus a conventional arrangement of processing equipment, in accordance with an embodiment of the present invention. Referring to FIG. 7, a cluster tool 702 is configured to accommodate a process flow with ex situ (to glove box) mask alignment. A conventional tool configuration 704 is also depicted. In an embodiment, cluster tool 702 has additional chambers to accommodate additional protective deposition operations, as described above, requiring alignment in a glove box. In one embodiment, cluster tool 702 includes a showerhead-based (with an external reservoir) or internal reservoir based direct lithium evaporator 706. In a specific embodiment, by incorporating an on-board lithium deposition chamber 706 into cluster tool 702, the need for ex situ transfer from tool-to-tool is eliminated. In another embodiment, cluster tool 702 includes a high lithium deposition rate chamber such as, but not limited to a lithium sputtering chamber. In a specific embodiment, the high lithium deposition rate chamber includes a source point for Argon gas to perform the sputtering of a lithium target. In an embodiment, the cluster tool 702 includes an annealing chamber 705, such as a rapid thermal anneal (RTA chamber), as depicted in FIG. 7.

Figure 8:
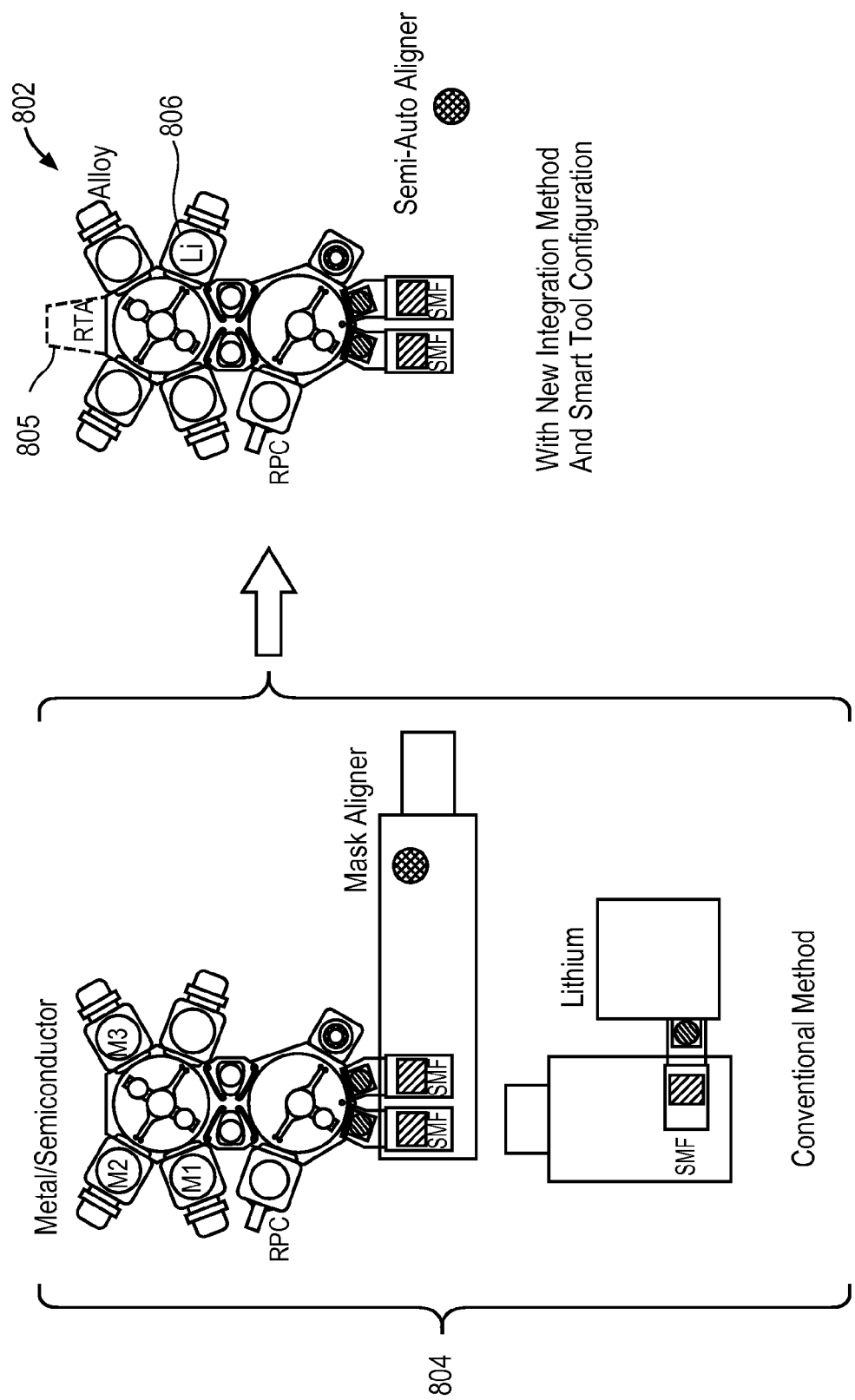
FIG. 8 illustrates an arrangement of a 200 millimeter cluster tool suitable for thin-film battery methods including the formation of alloy anodes, versus a conventional arrangement of processing equipment, in accordance with an embodiment of the present invention.

FIG. 8 illustrates an arrangement of a 200 millimeter cluster tool suitable for thin-film battery methods including the formation of alloy anodes, versus a conventional arrangement of processing equipment, in accordance with an embodiment of the present invention. Referring to FIG. 8, a cluster tool 802 is configured to accommodate a process flow with ex situ mask alignment. A conventional tool configuration 804 is also depicted. In an embodiment, cluster tool 802 has additional chambers to accommodate additional protective deposition operations, as described above. In one embodiment, an on-board lithium chamber 806 allows for silicon-lithium-silicon or lithium-silicon (silicon-on-top) types of deposition. In an embodiment, the cluster tool 802 includes an annealing chamber 805, such as a rapid thermal anneal (RTA chamber), as depicted in FIG. 8. Although this example is shown with a 200 millimeter Si—IC platform and chamber, the same concept can be extended to 300 millimeter and in-line tools.

Figure 9:
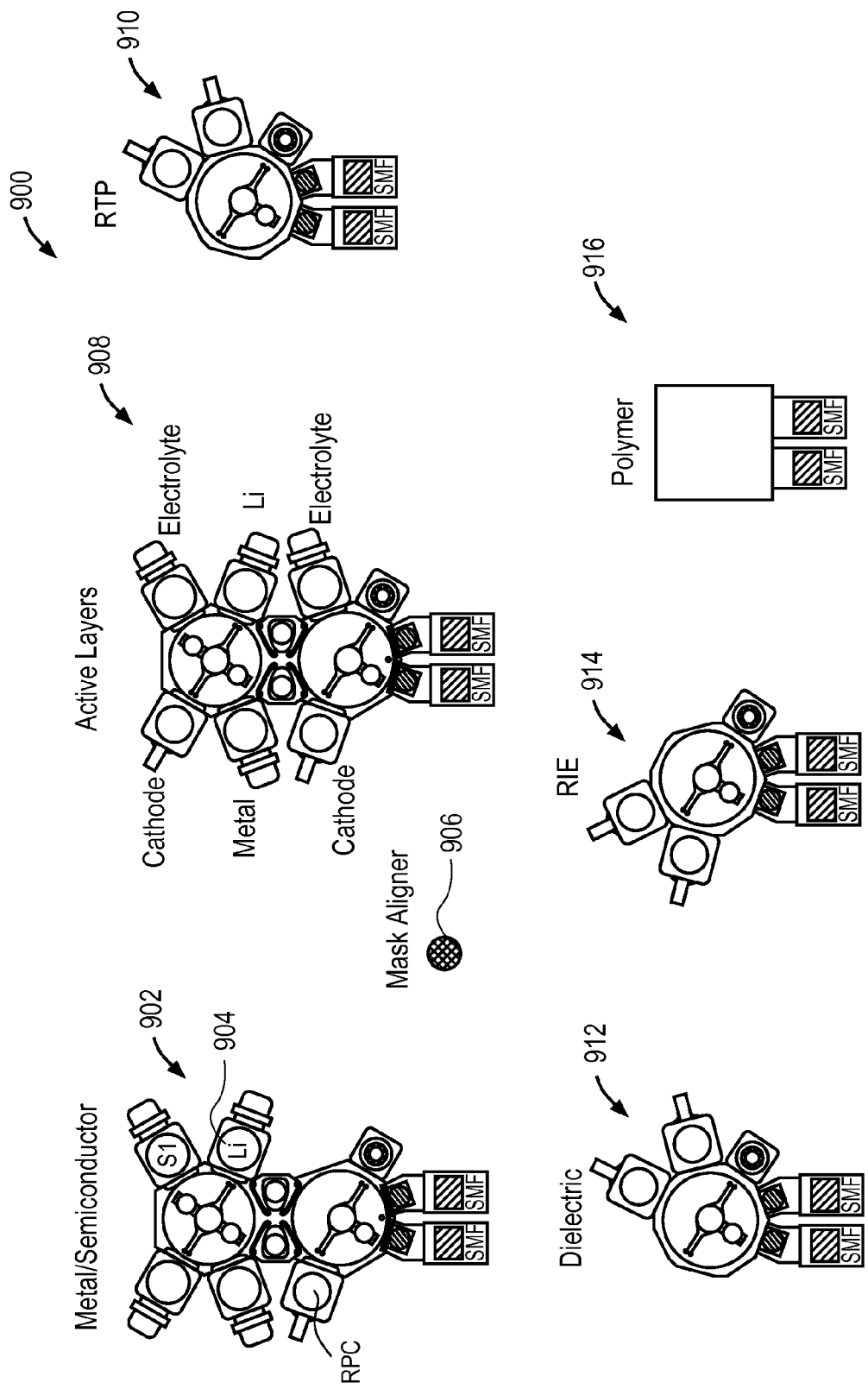
FIG. 9 illustrates a block diagram of a 200 millimeter thin-film battery manufacturing factory using an optimized masked process, in accordance with an embodiment of the present invention.

In another aspect of the present invention, an optimized thin-film battery factory is provided. It is to be understood that although 200 millimeter tool sets are shown as examples, such approaches can easily be implemented with 300 millimeter tool sets. FIG. 9 illustrates a block diagram of a 200 millimeter thin-film battery manufacturing factory using an optimized masked process, in accordance with an embodiment of the present invention.

Referring to FIG. 9, a factory 900 for fabrication of a thin-film battery using an optimized masked process includes a first process tool 902 for depositing metal or semiconductor layers. In accordance with an embodiment of the present invention, first process tool 902 includes a lithium chamber 904. In an embodiment, first process tool 902 is associated with a mask aligner 906. Factory 900 also includes a second process tool 908 for depositing active layers. In accordance with an embodiment of the present invention, second process tool 908 includes one or more cathode deposition chambers, a metal deposition chamber, one or more electrolyte deposition chambers, and a lithium deposition chamber, as depicted in FIG. 9. Factory 900 also includes a third process tool 910 for rapid thermal processing, a fourth process tool 912 for depositing dielectric layers, and a fifth process tool 914 for performing reactive ion etching. In accordance with an embodiment of the present invention, factory 900 also includes a sixth process tool 916 for depositing specialty layers for thin-film batteries. In accordance with an embodiment of the present invention, sixth process tool 916 is configured for deposition of a polymer layer, as depicted in FIG. 9. In addition, the first 902 and the second 908 tool sets, respectively for metal/semiconductors and active layers, can be fitted with on-board anneal chambers, as described with respect to FIGS. 7 and 8. Such a tool set allows fabrication thin film batteries in multiple materials and integration schemes.

In an aspect of the present invention, factory tool sets for mask-less process integration schemes are provided. In an embodiment, the factory includes a platform such as, but not limited to, a cluster tool platform, an in-line platform, an in-line platform targeted for high throughput, or a 200 mm-in-line combination platform. In one embodiment, a 200 mm-in-line combinatorial platform enables a manufacturer to allow easier scaling of device material layers (e.g., cathode and electrolyte) that have relatively lower deposition rates. In a specific embodiment, a system layout is modular in nature to allow adoption of multiple manners of integrating deposition and patterning for thin-film battery fabrication.

Figure 10:
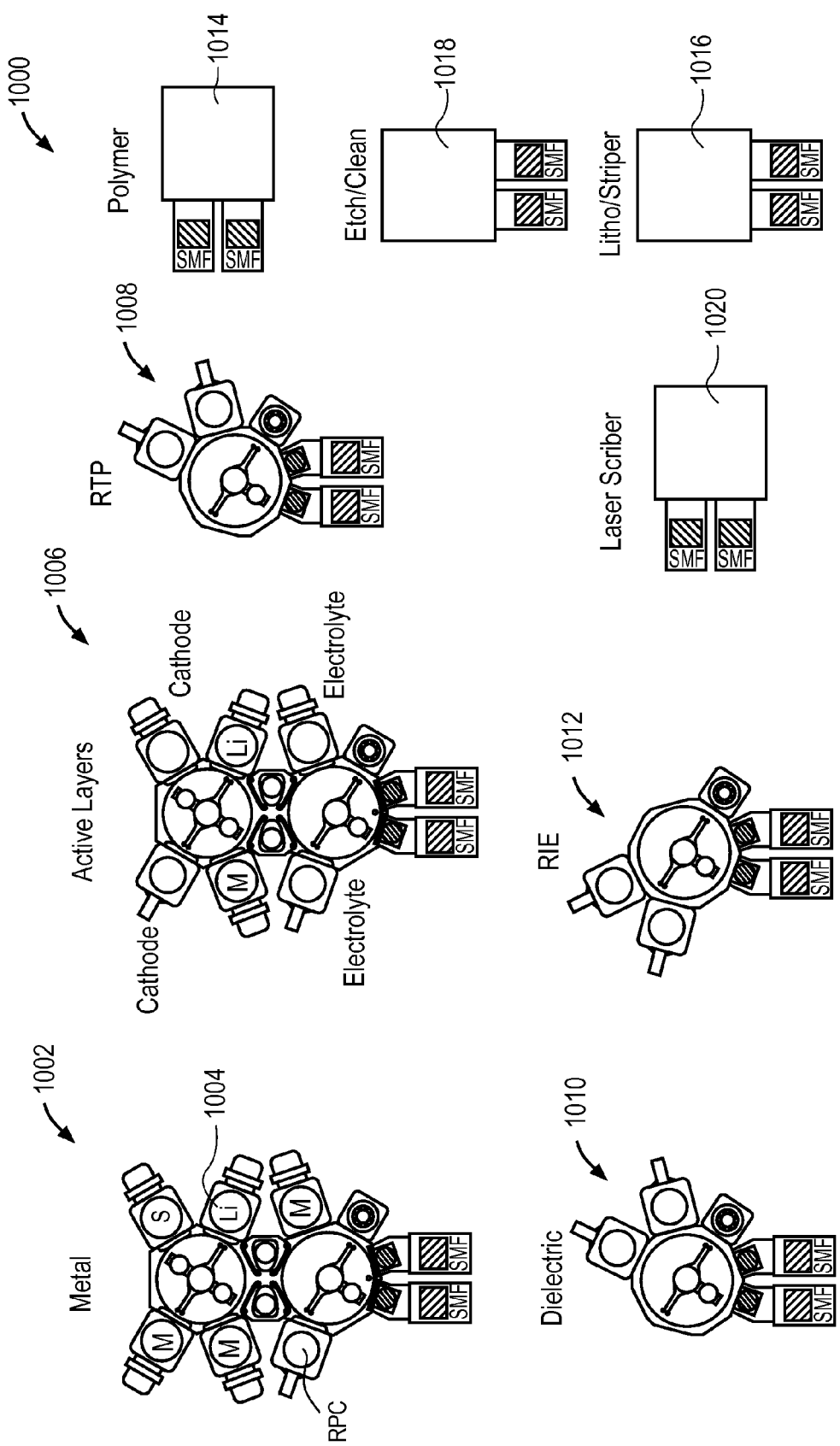
FIG. 10 illustrates a block diagram of a 200 millimeter thin-film battery manufacturing factory using a mask-less integration process, in accordance with an embodiment of the present invention.

FIG. 10 illustrates a block diagram of a 200 millimeter thin-film battery manufacturing factory using a mask-less integration process, in accordance with an embodiment of the present invention.

Referring to FIG. 10, a factory 1000 for fabrication of a thin-film battery using a mask-less integration process includes a first process tool 1002 for depositing metal layers. In accordance with an embodiment of the present invention, first process tool 1002 includes a lithium chamber 1004. Factory 1000 also includes a second process tool 1006 for depositing active layers. In accordance with an embodiment of the present invention, second process tool 1006 includes one or more cathode deposition chambers, one or more metal deposition chambers, one or more electrolyte deposition chambers, and a lithium deposition chamber, as depicted in FIG. 10. Factory 1000 also includes a third process tool 1008 for rapid thermal processing, a fourth process tool 1010 for depositing dielectric layers, and a fifth process tool 1012 for performing reactive ion etching. In accordance with an embodiment of the present invention, factory 1000 also includes additional process tools 1014, 1016, 1018 and 1020 for performing process operations in the fabrication of thin-film batteries. In accordance with an embodiment of the present invention, process tool 1014 is configured for deposition of a polymer layer, process tool 1016 is configured for lithography exposure and resist strip operations, process tool 1018 is configured for etching and cleaning operations, and process tool 1020 is configured for laser scribing of wafers upon which thin-film batteries are fabricated, as depicted in FIG. 10. Analogous to FIG. 9, the first 1002 and the second 1006 tool sets, respectively for metal and active layers, can be fitted with on-board anneal chambers. Depending on the integration scheme, it is possible that the sidewall of air sensitive layers may be exposed during ex situ pattering. In such a case, appropriate tools will need to be configured to eliminate the air exposure, for examples by interfacing them with glove boxes or clustering the chambers to enable direct transfer.

Figure 11:
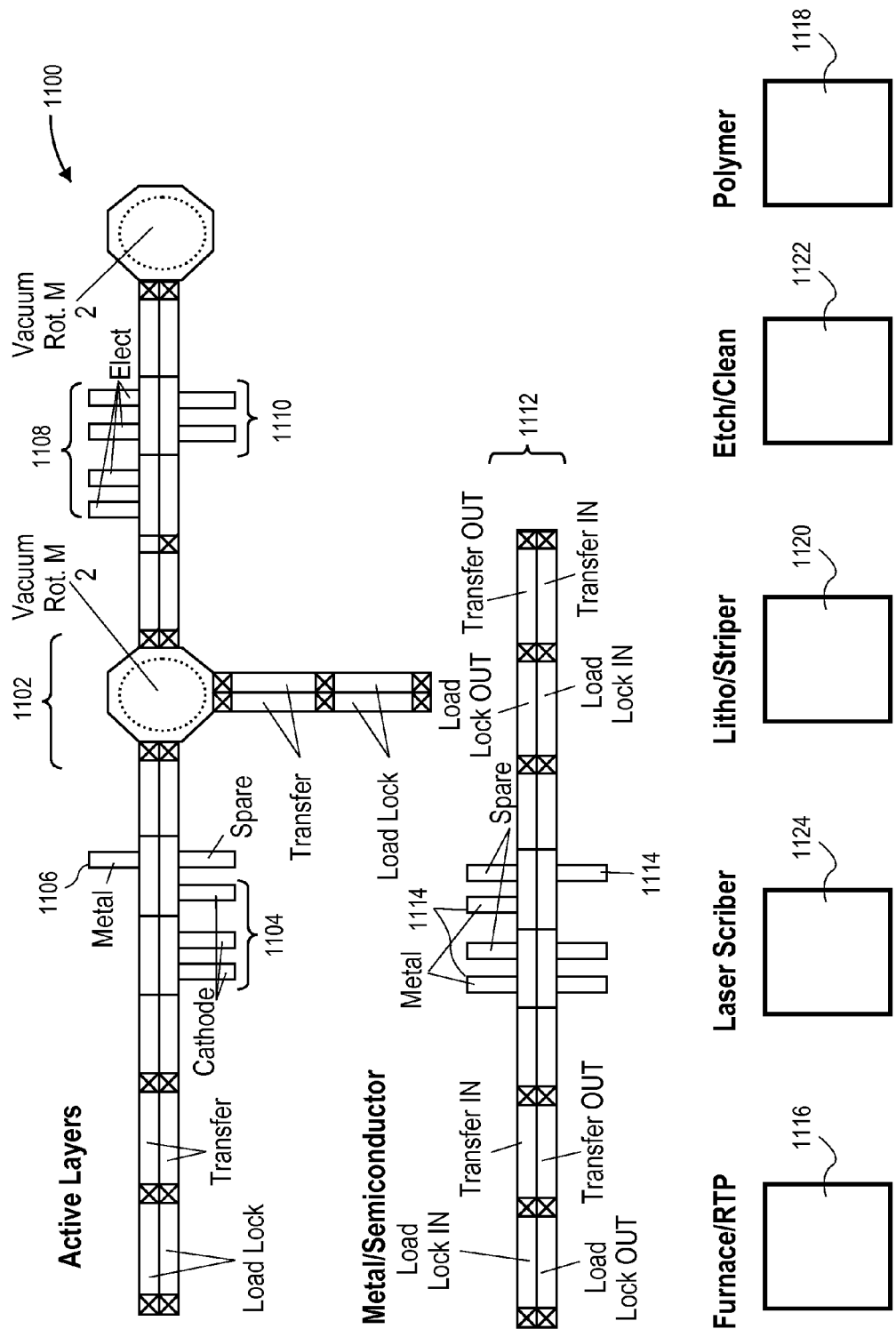
FIG. 11 illustrates a block diagram of an in-line large area coater thin-film battery manufacturing factory using a mask-less integration process, in accordance with an embodiment of the present invention.

FIG. 11 illustrates a block diagram of an in-line large area coater thin-film battery manufacturing factory using a mask-less integration process, in accordance with an embodiment of the present invention.

Referring to FIG. 11, a factory 1100 for fabrication of a thin-film battery using a mask-less integration process includes a first process tool 1102 for depositing active layers. In accordance with an embodiment of the present invention, first process tool 1102 includes a plurality of cathode deposition chambers 1104, a metal deposition chamber 1106, a plurality of electrolyte deposition chambers 1108, and a plurality of lithium deposition chambers 1110, as depicted in FIG. 11. Factory 1100 also includes a second process tool 1112 for depositing metal or semiconductor layers. In accordance with an embodiment of the present invention, second process tool 1112 includes a plurality of metal chambers 1114. In an embodiment, factory 1100 also includes additional process tools 1116, 1118, 1120, 1122 and 1124 for performing various process operations in the fabrication of thin-film batteries. In one embodiment, process tool 1116 is configured for rapid thermal processing, process tool 1118 is configured for deposition of a polymer layer, process tool 1120 is configured for lithography exposure and resist strip operations, process tool 1122 is configured for etching and cleaning operations, and process tool 1124 is configured for laser scribing of wafers upon which thin-film batteries are fabricated, as depicted in FIG. 11. This particular configuration for the deposition tool is for cathodes that are either not air sensitive (with or without anneal) or air sensitive but does not require anneal with Lithium anode. Analogous configuration for other types of cathode-anode pair and process integration flows can easily be derived using the similar concepts.

Figure 12:
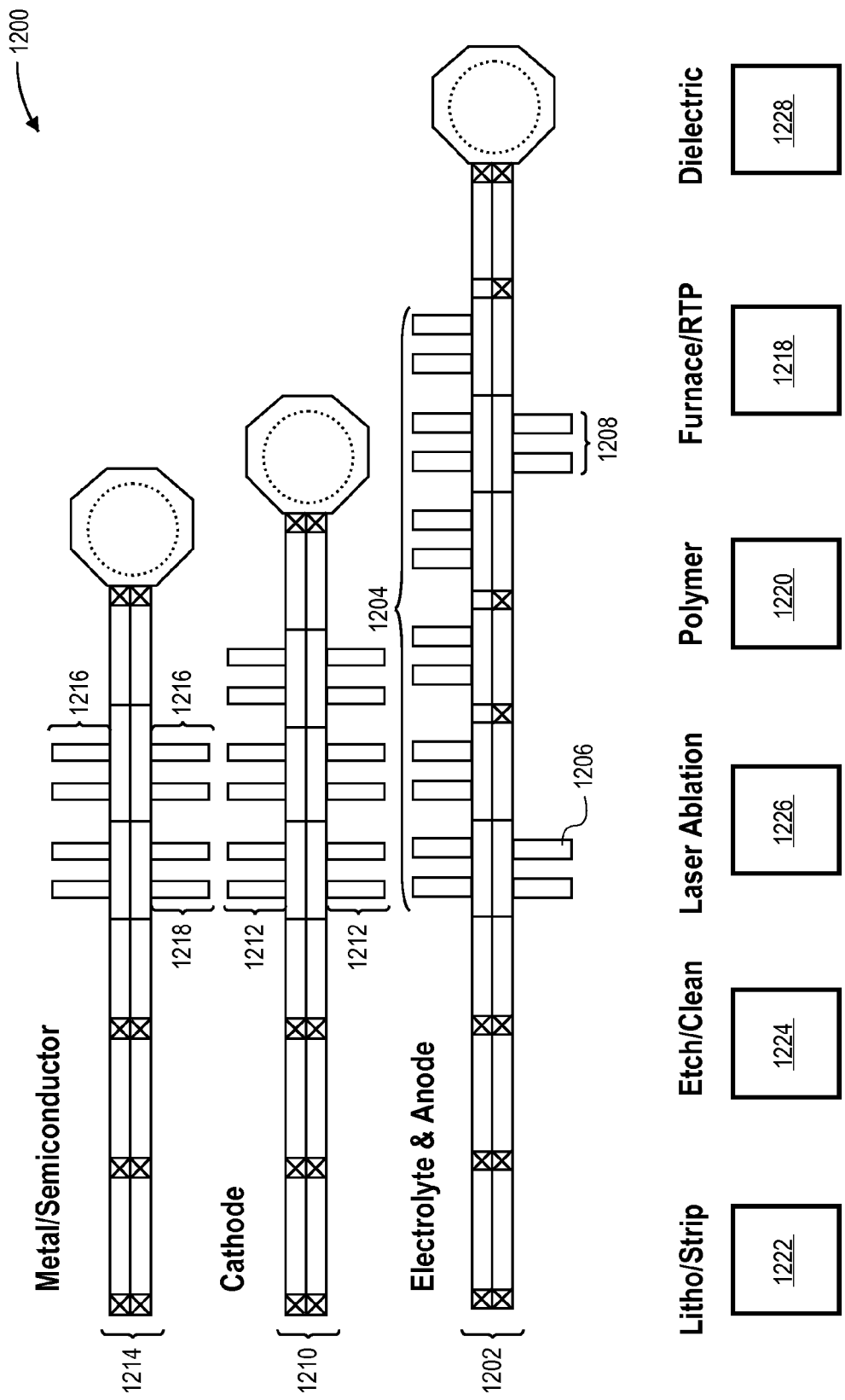
FIG. 12 illustrates a block diagram of an in-line large area coater thin-film battery manufacturing factory, designed for high throughput, using a mask-less integration process, in accordance with an embodiment of the present invention.

FIG. 12 illustrates a block diagram of an in-line large area coater thin-film battery manufacturing factory, designed for high throughput, using a mask-less integration process, in accordance with an embodiment of the present invention.

Referring to FIG. 12, a factory 1200, designed for high throughput, for fabrication of a thin-film battery using a mask-less integration process includes a first process tool 1202 for depositing electrolyte and anode layers. In accordance with an embodiment of the present invention, first process tool 1202 includes a plurality of electrolyte deposition chambers 1204, one or more metal deposition chambers 1206, and one or more lithium deposition chambers 1208, as depicted in FIG. 12. Factory 1200 also includes a second process tool 1210 for depositing cathode layers. In accordance with an embodiment of the present invention, second process tool 1210 includes a plurality of cathode deposition chambers 1212, as depicted in FIG. 12. Factory 1200 also includes a third process tool 1214 for depositing metal or semiconductor layers. In accordance with an embodiment of the present invention, third process tool 1214 includes a plurality of metal chambers 1216 and a plurality of semiconductor chambers 1218. In an embodiment, factory 1200 also includes additional process tools 1218, 1220, 1222, 1224, 1226 and 1228 for performing various process operations in the fabrication of thin-film batteries. In one embodiment, process tool 1218 is configured for rapid thermal processing, process tool 1220 is configured for deposition of a polymer layer, process tool 1222 is configured for lithography exposure and resist strip operations, process tool 1224 is configured for etching and cleaning operations, process tool 1226 is configured for laser ablation, and process tool 1228 is configured for dielectric layer deposition, as depicted in FIG. 12. This particular system may be set up for $LiCoO_2$—Li cells. Analogous configuration for other types of cathode-anode pair and process integration flows can easily be derived using the similar concepts.

Figure 13:
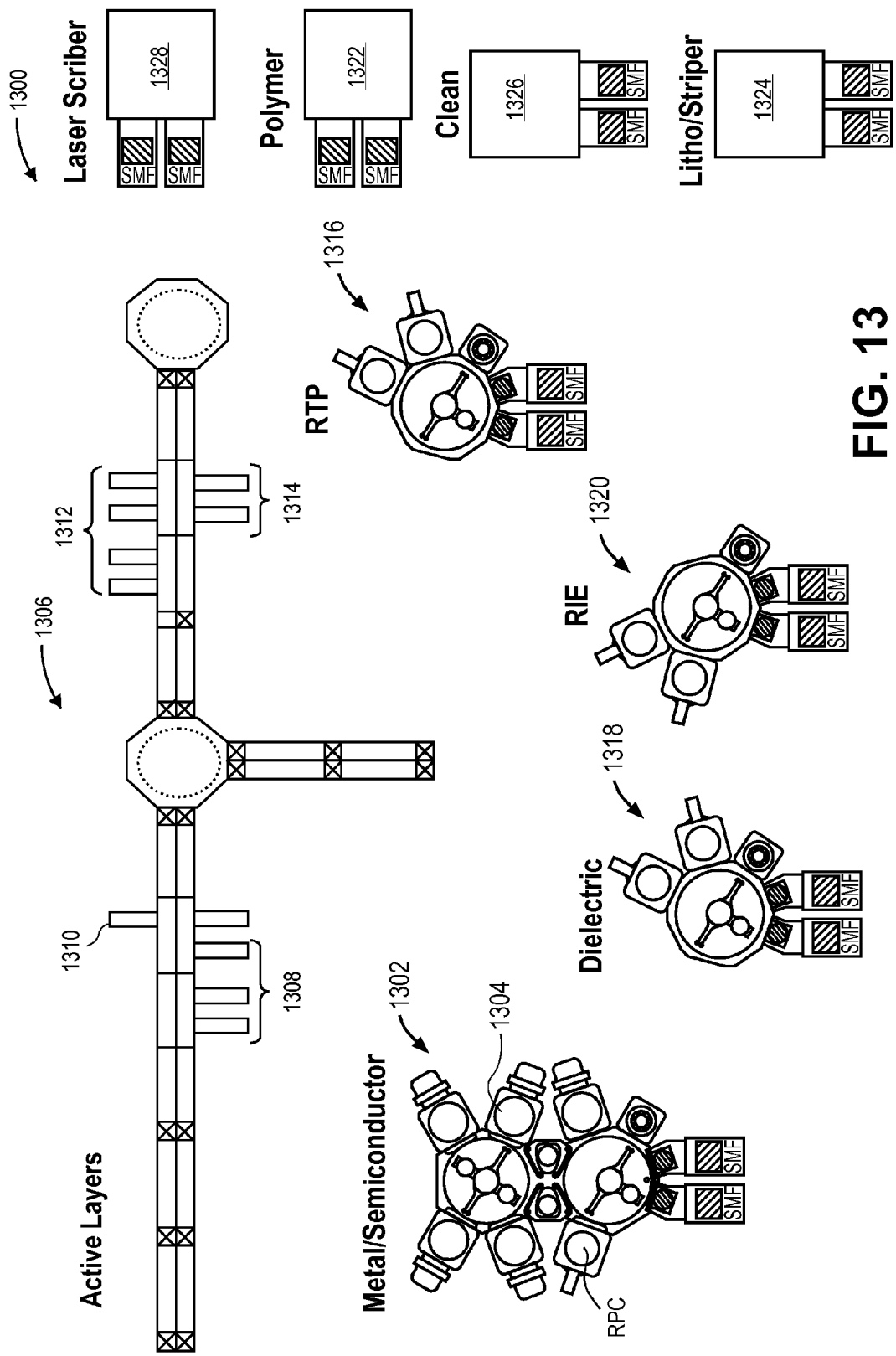
FIG. 13 illustrates a block diagram of a combination 200 millimeter and in-line large area coater thin-film battery manufacturing factory, in accordance with an embodiment of the present invention.

FIG. 13 illustrates a block diagram of a combination 200 millimeter and in-line large area coater thin-film battery manufacturing factory, in accordance with an embodiment of the present invention. In this case, the in-line tool will process multiple number of 200 millimeter tool compatible substrates.

Referring to FIG. 13, a factory 1300 for fabrication of a thin-film battery includes a first process tool 1302 for depositing metal or semiconductor layers. In accordance with an embodiment of the present invention, first process tool 1302 includes a lithium chamber 1304. The first process tool 1302 can be fitted with an on-board anneal chamber as shown in FIGS. 7 and 8. Factory 1300 also includes a second, in-line, process tool 1306 for depositing active layers. In accordance with an embodiment of the present invention, second process tool 1306 includes a plurality of cathode deposition chambers 1308, one or more metal deposition chambers 1310, a plurality of electrolyte deposition chambers 1312, and one or more lithium deposition chambers 1314, as depicted in FIG. 13. Factory 1300 also includes a third process tool 1316 for rapid thermal processing, a fourth process tool 1318 for depositing dielectric layers, and a fifth process tool 1320 for performing reactive ion etching. In accordance with an embodiment of the present invention, factory 1300 also includes additional process tools 1322, 1324, 1326 and 1328 for performing process operations in the fabrication of thin-film batteries. In accordance with an embodiment of the present invention, process tool 1322 is configured for deposition of a polymer layer, process tool 1324 is configured for lithography exposure and resist strip operations, process tool 1326 is configured for cleaning operations, and process tool 1328 is configured for laser scribing of wafers upon which thin-film batteries are fabricated, as depicted in FIG. 13.

Figure 14:
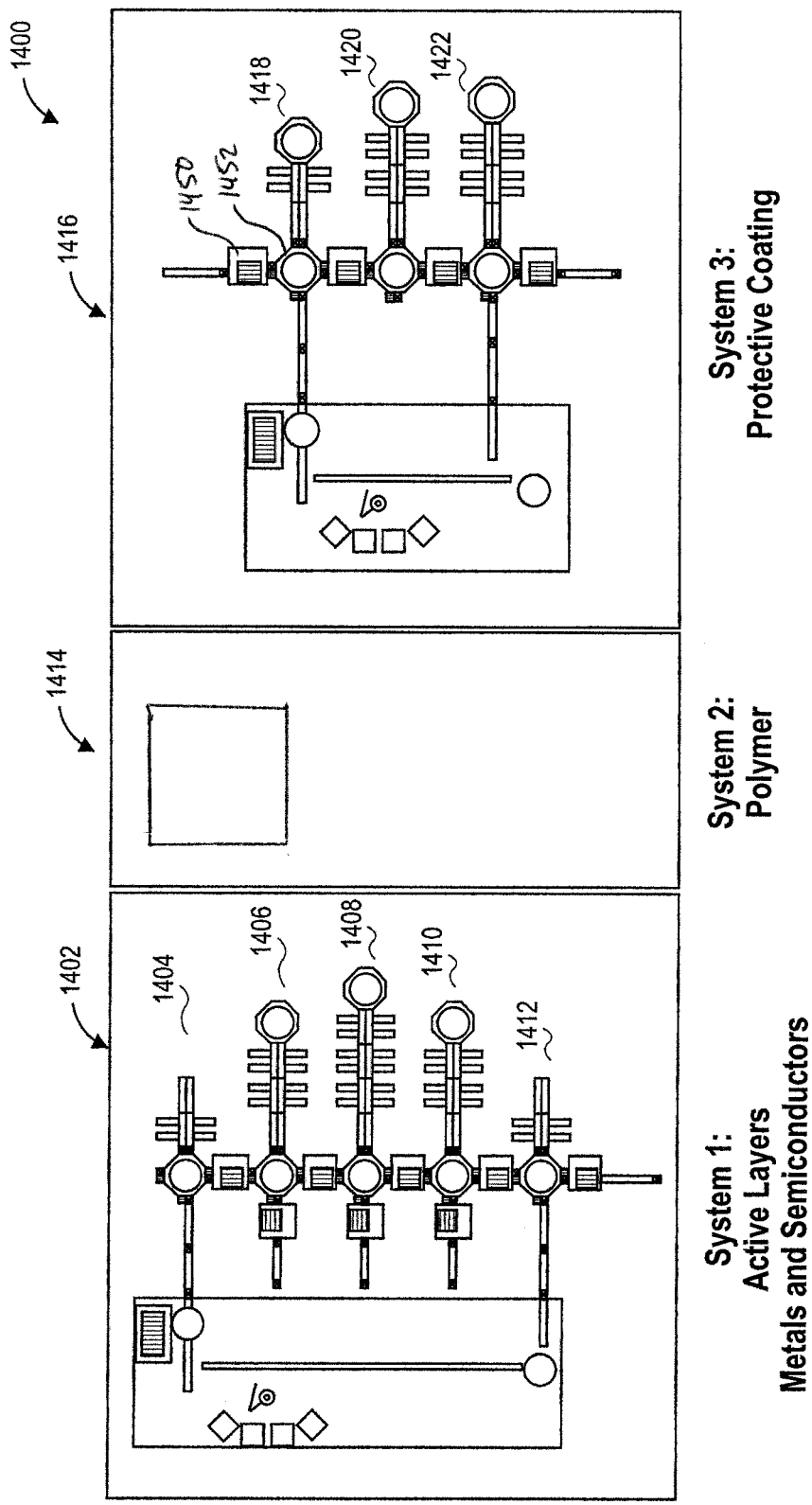
FIG. 14 illustrates a block diagram of a high volume manufacturing tool set for thin-film battery manufacturing with masked integration including in situ mask management, in accordance with an embodiment of the present invention.

In another aspect of the present invention, an in-line factory model for a shadow mask-based integration scheme is provided. In an embodiment, the mask alignment and management are performed in situ. In one embodiment, a tool set is based on exemplary process integration schemes and can easily be adapted to any changes in an integration flow. FIG. 14 illustrates a block diagram of a high volume manufacturing tool set for thin-film battery manufacturing with masked integration including in situ mask management, in accordance with an embodiment of the present invention.

Referring to FIG. 14, a factory 1400 for fabrication of thin-film batteries with masked integration including in situ mask management includes a system 1402 with coupled process tools for depositing active layers, metals and semiconductors. In accordance with an embodiment of the present invention, system 1402 includes a first process tool 1404 for depositing metal and dielectric layers, a second process tool 1406 for depositing semiconductor layers, a third process tool 1408 for depositing electrolytic layers, a fourth process tool 1410 for depositing cathode layers, and a fifth process tool 1412 for depositing metal layers. Factory 1400 also includes a system 1414 for depositing polymers and a system 1416 with coupled process tools for forming protective coatings. In accordance with an embodiment of the present invention, system 1416 is for the protective coating deposition and patterning. This particular configuration depicts a multiple layer and material capable system with two different mask operations. Thus, the three integrated modules 1418, 1420 and 1422 can be used for a combination of the generic or specific materials such as dielectric and metal layers as well for etching processing for patterning. Also depicted in FIG. 14 are units of a mask management system. For example, 1450 is a rotation-alignment module, while 1452 is a mask storage area with separate mask load/unload port for regeneration and reload without venting up a corresponding chamber.

Figure 15:
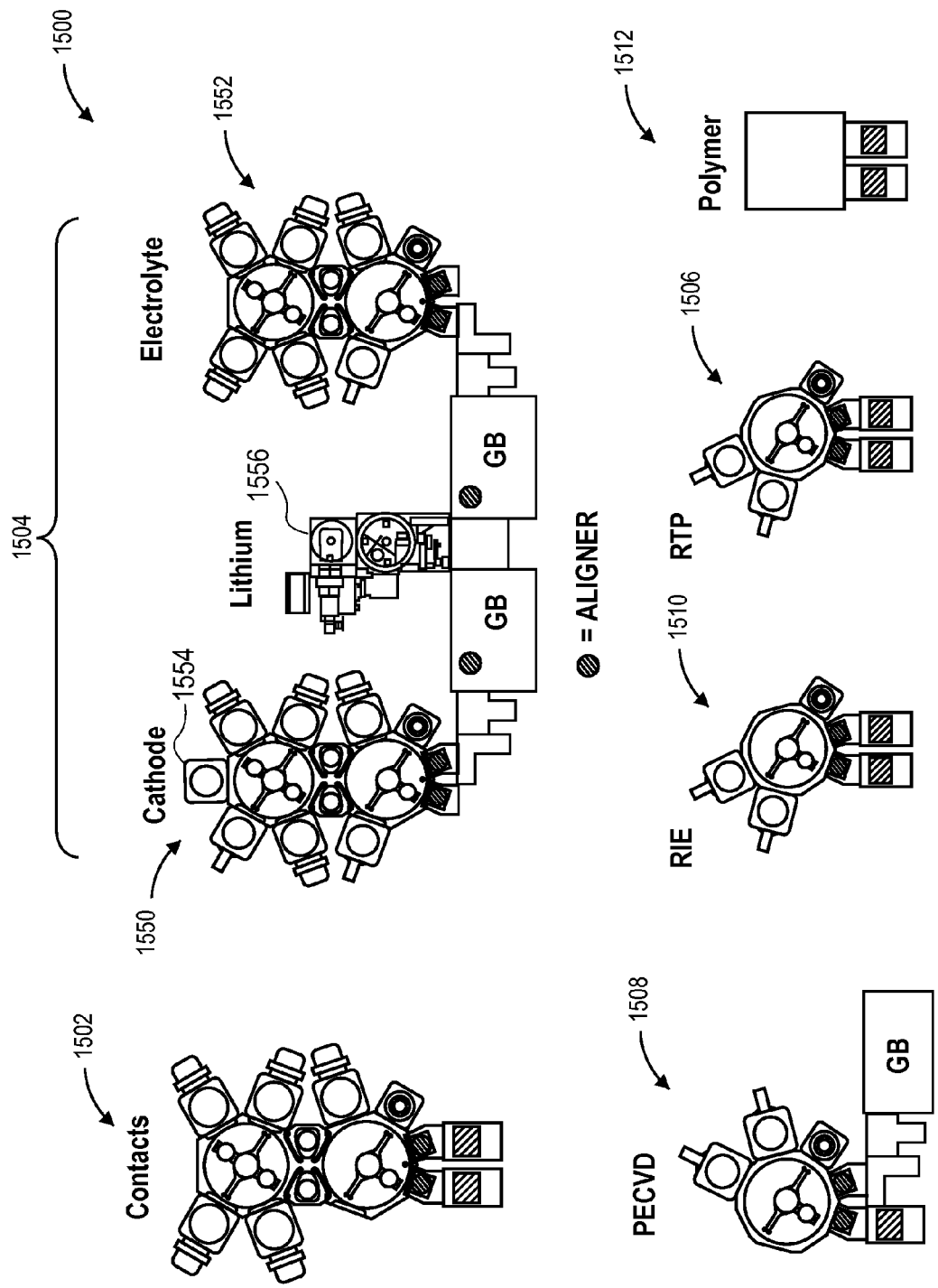
FIG. 15 illustrates a block diagram of a 200 millimeter thin-film battery manufacturing factory using a standard lithium evaporation tool, in accordance with an embodiment of the present invention.

In another aspect of the present invention, a factory model with a standard lithium evaporation tool is provided. FIG. 15 illustrates a block diagram of a 200 millimeter thin-film battery manufacturing factory using a standard lithium evaporation tool, in accordance with an embodiment of the present invention. This configuration may be for handling air sensitive cathode materials.

Referring to FIG. 15, a factory 1500 for fabrication of a thin-film battery includes a first process tool 1502 for depositing metal or semiconductor layers to form contacts for a thin-film battery. Factory 1500 also includes a second process tool 1504 for depositing cathode layers, electrolyte layers, and lithium. Second process tool 1504 includes a first cluster tool 1550 for deposition of cathode layers, and a second cluster tool 1552 for deposition of electrolyte layers. In one embodiment, first cluster tool 1550 is equipped with a thermal anneal chamber 1554 for in situ annealing, but is not equipped with a chamber for depositing lithium or lithium-containing layers, as is depicted in FIG. 15. Instead, in accordance with an embodiment of the present invention, second process tool 1504 includes a standard lithium evaporation tool 1556 equipped with one or more gloveboxes (GBs) coupling the standard lithium evaporation tool 1556 to first cluster tool 1550 and to second cluster tool 1552.

Referring again to FIG. 15, factory 1500 also includes a third process tool 1506 for rapid thermal processing, a fourth process tool 1508 for depositing layers by plasma-enhanced physical vapor deposition (PECVD), a fifth process tool 1510 for performing reactive ion etching, and a sixth process tool 1512 for depositing specialty layers for thin-film batteries, such as polymer layers. In one embodiment, fourth process tool 1508 is coupled to a glovebox (GB) for specialty processing needs, as depicted in FIG. 15.

Figure 16:
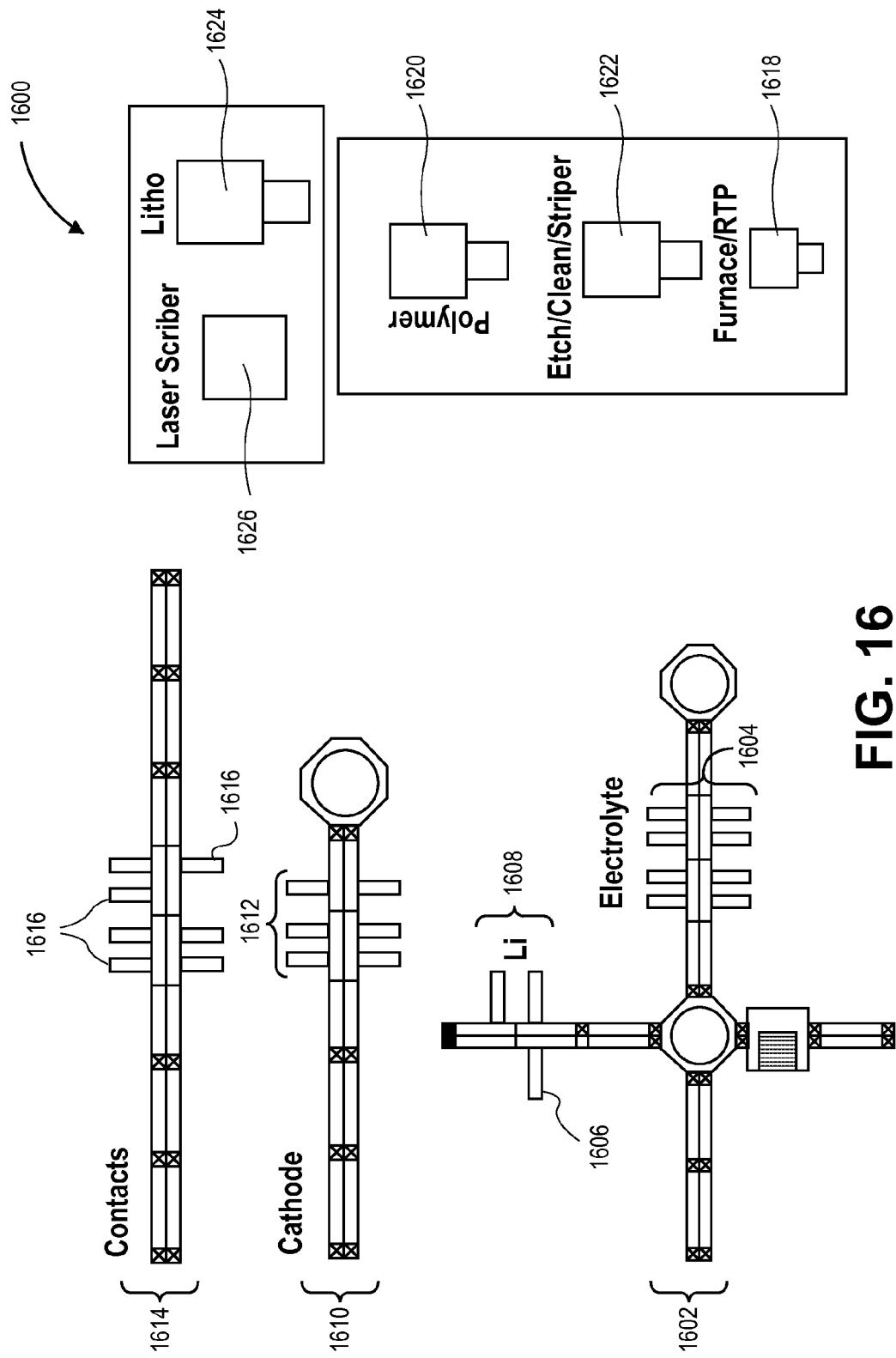
FIG. 16 illustrates a block diagram of an in-line large area coater thin-film battery manufacturing factory, designed for high throughput, using a single mask integration process, in accordance with an embodiment of the present invention.

FIG. 16 illustrates a block diagram of an in-line large area coater thin-film battery manufacturing factory, designed for high throughput, using a single mask integration process, in accordance with an embodiment of the present invention.

Referring to FIG. 16, a factory 1600, designed for high throughput, for fabrication of a thin-film battery using a single mask integration process includes a first process tool 1602 for depositing electrolyte and lithium-based layers. In accordance with an embodiment of the present invention, first process tool 1602 includes a plurality of electrolyte deposition chambers 1604, one or more metal deposition chambers 1606, and one or more lithium deposition chambers 1608, as depicted in FIG. 16. Factory 1600 also includes a second process tool 1610 for depositing cathode layers. In accordance with an embodiment of the present invention, second process tool 1610 includes a plurality of cathode deposition chambers 1612, as depicted in FIG. 16. Factory 1600 also includes a third process tool 1614 for depositing metal or semiconductor layers for use in forming contacts for a thin-film battery. In accordance with an embodiment of the present invention, third process tool 1614 includes a plurality of metal chambers 1616, such as titanium (TI), aluminum (Al), and gold/platinum (Au/Pt) deposition chambers, as depicted in FIG. 16. In an embodiment, factory 1600 also includes additional groupings of process tools 1618, 1620, 1622, 1624 and 1626 for performing various process operations in the fabrication of thin-film batteries. In one embodiment, a grouping of peripheral tools includes process tool 1618 configured for rapid thermal processing, process tool 1620 configured for deposition of polymer layers, and process tool 1622 configured for etching, cleaning, and stripping operations, as depicted in FIG. 16. In one embodiment, a grouping of patterning tools includes process tool 1624 configured for lithography exposure, and process tool 1626 configured for laser scribing, as depicted in FIG. 16. In accordance with an embodiment of the present invention, factory 1600 can be used to perform an integration process that is a hybrid between a mask-less integration scheme and a masked integration scheme. This particular factory may be for LiCoO$_2$—Li cells. Analogous configuration for other types of cathode-anode pair and process integration flows can be derived using the similar concepts.

Thus, in one or more embodiments of the present invention, a factory layout for lithium-based thin-film battery manufacturing is provided. The factory layout includes a first process tool for depositing metal or semiconductor layers, a second process tool for depositing active layers, a third process tool for rapid thermal processing, a fourth process tool for depositing dielectric layers, a fifth process tool for performing reactive ion etching, and a sixth process tool for depositing specialty layers for thin-film batteries.

In one embodiment, the sixth process tool is configured for deposition of both a lithium or lithium-containing layer and a protective coating in the same process tool. In a specific embodiment, the lithium layer is a lithium anode layer and the protective coating is a polymer layer. In one embodiment, the first process tool includes a first lithium chamber and the second process tool includes a second lithium chamber. In a specific embodiment, the sixth process tool is configured for deposition of a polymer layer. In a particular embodiment, the factory layout further includes a seventh process tool set configured for lithography exposure and resist strip operations, an eighth process tool set configured for etching and cleaning operations, and a ninth process tool configured for laser scribing of wafers or substrates upon which thin-film batteries are fabricated. In one embodiment, the second process tool includes a first cluster tool for deposition of cathode layers, a second cluster tool for deposition of electrolyte layers, and a lithium evaporation tool including one or more gloveboxes coupling the lithium evaporation tool to the first cluster tool and to the second cluster tool. In one embodiment, the lithium-based thin-film battery manufacturing includes a masked integration scheme. In one embodiment, the lithium-based thin-film battery manufacturing includes a mask-less integration scheme.

In one or more other embodiments of the present invention, a different factory layout for lithium-based thin-film battery manufacturing is provided. The factory layout includes a first process tool for depositing active layers, wherein the first process tool is an in-line process tool and a second process tool for depositing metal or semiconductor layers.

In one embodiment, the first process tool includes a plurality of lithium deposition chambers. In a specific embodiment, the factory layout further includes a third process tool configured for rapid thermal processing, a fourth process tool configured for deposition of a polymer layer, a fifth process tool set configured for lithography exposure and resist strip operations, a sixth process tool set configured for etching and cleaning operations, and a seventh process tool configured for laser scribing of wafers upon which thin-film batteries are fabricated. In one embodiment, the first process tool is configured for depositing electrolyte and anode layers, and the second process tool is an in-line process tool. The factory layout further includes a third process tool configured for depositing cathode layers, wherein the third process tool is an in-line process tool. In a specific embodiment, the second process tool includes a plurality of lithium deposition chambers and the factory layout further includes a fourth process tool configured for rapid thermal processing, a fifth process tool configured for deposition of a polymer layer, a sixth process tool configured for lithography exposure and resist strip operations, a seventh process tool configured for etching and cleaning operations, an eighth process tool configured for laser ablation, and a ninth process tool configured for depositing dielectric layers. In one embodiment, the second process tool is a cluster process tool. In a specific embodiment, the second process tool includes a chamber configured for deposition of a lithium or lithium-containing layer. In one embodiment, the second process tool is an in-line process tool and is coupled directly to the first process tool. The factory layout further includes a third process tool for depositing protective coating layers, wherein the third process tool is an in-line process tool. In one embodiment, the first process tool is configured for depositing cathode layers, the second process tool is an in-line process tool and is configured for depositing contact layers, and the factory layout further includes a third process tool for depositing electrolyte and lithium or lithium-containing layers, wherein the third process tool is an in-line process tool. In one embodiment, the lithium-based thin-film battery manufacturing includes a masked integration scheme. In one embodiment, the lithium-based thin-film battery manufacturing includes a mask-less integration scheme.

Thus, methods of and factories for thin-film battery manufacturing have been disclosed. In accordance with an embodiment of the present invention, a method includes operations for fabricating a thin-film battery. In accordance with another embodiment of the present invention, a factory includes one or more tool sets for fabricating a thin-film battery.

What is claimed is:

1. A factory layout for lithium-based thin-film battery manufacturing, the factory layout comprising:
    a first process tool for depositing metal or semiconductor layers;
    a second process tool for depositing active layers, the second process tool comprising:
        a first cluster tool for deposition of cathode layers;
        a second cluster tool for deposition of electrolyte layers; and
        a lithium evaporation tool comprising one or more gloveboxes coupling the lithium evaporation tool to the first cluster tool and to the second cluster tool;
    a third process tool for rapid thermal processing;
    a fourth process tool for depositing dielectric layers;
    a fifth process tool for performing reactive ion etching; and
    a sixth process tool for depositing specialty layers for thin-film batteries.

2. The factory layout of claim 1, wherein the sixth process tool is configured for deposition of both a lithium or lithium-containing layer and a protective coating in the same process tool.

3. The factory layout of claim 2, wherein the lithium layer is a lithium anode layer and the protective coating is a polymer layer.

4. The factory layout of claim 1, wherein the first process tool comprises a lithium chamber different from the lithium evaporation tool of the second process tool.

5. The factory layout of claim 4, wherein the sixth process tool is configured for deposition of a polymer layer.

6. The factory layout of claim 5, further comprising:
    a seventh process tool set configured for lithography exposure and resist strip operations;
    an eighth process tool set configured for etching and cleaning operations; and
    a ninth process tool configured for laser scribing of wafers or substrates upon which thin-film batteries are fabricated.

7. The factory layout of claim 1, wherein the lithium-based thin-film battery manufacturing comprises a masked integration scheme.

8. The factory layout of claim 1, wherein the lithium-based thin-film battery manufacturing comprises a mask-less integration scheme.

9. The factory layout of claim 1, wherein the lithium evaporation tool is positioned between the first cluster tool and the second cluster tool, a first of the one or more gloveboxes couples the first cluster tool to the lithium evaporation tool, and a second of the one or more gloveboxes couples the first cluster tool to the lithium evaporation tool.

10. A factory layout for lithium-based thin-film battery manufacturing, the factory layout comprising:
- a first process tool for depositing metal or semiconductor layers;
- a second process tool for depositing active layers, the second process tool comprising:
  - a first cluster tool for deposition of cathode layers;
  - a second cluster tool for deposition of electrolyte layers; and
  - a lithium evaporation tool positioned between the first cluster tool and the second cluster tool, wherein a first of glovebox couples the first cluster tool to the lithium evaporation tool, and a second glovebox couples the first cluster tool to the lithium evaporation tool;
- a third process tool for rapid thermal processing;
- a fourth process tool for depositing dielectric layers;
- a fifth process tool for performing reactive ion etching; and
- a sixth process tool for depositing specialty layers for thin-film batteries.

11. The factory layout of claim 10, wherein the sixth process tool is configured for deposition of both a lithium or lithium-containing layer and a protective coating in the same process tool.

12. The factory layout of claim 11, wherein the lithium layer is a lithium anode layer and the protective coating is a polymer layer.

13. The factory layout of claim 10, wherein the first process tool comprises a lithium chamber different from the lithium evaporation tool of the second process tool.

14. The factory layout of claim 13, wherein the sixth process tool is configured for deposition of a polymer layer.

15. The factory layout of claim 14, further comprising:
- a seventh process tool set configured for lithography exposure and resist strip operations;
- an eighth process tool set configured for etching and cleaning operations; and
- a ninth process tool configured for laser scribing of wafers or substrates upon which thin-film batteries are fabricated.

16. The factory layout of claim 10, wherein the lithium-based thin-film battery manufacturing comprises a masked integration scheme.

17. The factory layout of claim 10, wherein the lithium-based thin-film battery manufacturing comprises a mask-less integration scheme.

18. A process tool for lithium-based thin-film battery manufacturing, the process tool comprising:
- a first cluster tool for deposition of cathode layers;
- a second cluster tool for deposition of electrolyte layers; and
- a lithium evaporation tool comprising one or more gloveboxes coupling the lithium evaporation tool to the first cluster tool and to the second cluster tool.

19. The process tool of claim 18, wherein the lithium evaporation tool is positioned between the first cluster tool and the second cluster tool, a first of the one or more gloveboxes couples the first cluster tool to the lithium evaporation tool, and a second of the one or more gloveboxes couples the first cluster tool to the lithium evaporation tool.

* * * * *

UNITED STATES PATENT AND TRADEMARK OFFICE
CERTIFICATE OF CORRECTION

PATENT NO.      : 8,464,419 B2  
APPLICATION NO. : 12/882002  
DATED           : June 18, 2013  
INVENTOR(S)     : Byung-Sung Kwak et al.

Page 1 of 1

It is certified that error appears in the above-identified patent and that said Letters Patent is hereby corrected as shown below:

IN THE CLAIMS

Column 13, line 8 delete "first" and insert --second--.
Column 13, line 23 delete "first" and insert --second--.
Column 14, line 33 delete "first" and insert --second--.

Signed and Sealed this
Eighteenth Day of February, 2014

Michelle K. Lee
*Deputy Director of the United States Patent and Trademark Office*